United States Patent
Nottingham et al.

(10) Patent No.: US 8,444,274 B1
(45) Date of Patent: May 21, 2013

(54) RECIPROCATING SLIDE ANIMATION PROJECTOR AND METHOD OF PROJECTION

(75) Inventors: John R. Nottingham, Cleveland, OH (US); John W. Spirk, Cleveland, OH (US); Douglas Gall, Cleveland, OH (US); Patrick Brown, Cleveland, OH (US); William Rabbitt, Cleveland, OH (US); Trevor Jackson, Cleveland, OH (US)

(73) Assignee: Nottingham Spirk Design Associates, Cleveland, OH (US)

( * ) Notice: Subject to any disclaimer, the term of this patent is extended or adjusted under 35 U.S.C. 154(b) by 868 days.

(21) Appl. No.: 12/463,618

(22) Filed: May 11, 2009

Related U.S. Application Data

(60) Provisional application No. 61/073,404, filed on Jun. 18, 2008.

(51) Int. Cl.
*G03B 21/00* (2006.01)
*G03B 23/04* (2006.01)

(52) U.S. Cl.
USPC ............................................ 353/46; 353/106

(58) Field of Classification Search
USPC ............. 353/46, 47, 50, 51, 91, 92, 103–107, 353/114–117, 119–121; 352/38, 72, 78 R, 352/78 C, 87, 166, 232; 362/806–808; 40/362, 40/366, 374, 490
See application file for complete search history.

(56) References Cited

U.S. PATENT DOCUMENTS

| | | | |
|---|---|---|---|
| 3,048,083 A * | 8/1962 | Rosenbaum | 353/10 |
| 3,706,439 A | 12/1972 | Skinner et al. | |
| 4,253,749 A | 3/1981 | Boudouris | |
| 4,814,800 A | 3/1989 | Lavinsky et al. | |
| 5,570,138 A | 10/1996 | Baron | |
| 5,760,874 A * | 6/1998 | Rudnick | 352/101 |

* cited by examiner

Primary Examiner — Pascal M Bui Pho
(74) Attorney, Agent, or Firm — John D. Gugliotta, Esq.

(57) ABSTRACT

A slide animation projector for the yard comprises a solenoid that forces a translating rod to reciprocate in a spiked motion. An elongated slot in the translating rod seats a slide cartridge having at least two stationary, adjacent images. The slide reciprocates in repeated succession, wherein the adjacent images give an impression of movement.

6 Claims, 5 Drawing Sheets

RECIPROCATING SLIDE ANIMATION PROJECTOR AND METHOD OF PROJECTION

RELATED APPLICATIONS

The present invention is a Continuation of U.S. Application No. 61/073,404 and it claims a benefit to that provisional's Sep. 2, 2008 filing date. The present invention incorporates all subject matter of the '404 application as if it is fully rewritten herein.

BACKGROUND OF THE INVENTION

1. Field of the Invention

The present invention relates generally to an animated picture projector and, more specifically, to a projector which reciprocates in repeated succession at least two stationary images on a slide to give an impression of motion.

2. Description of the Related Art

In many parts of the world there is a longstanding tradition of decorating homes' and business' exteriors with lights, wreaths and figurines. A projection of images on a buildings' flat surface is an increasingly popular way to express holiday spirit. A number of commercially-available projectors are capable of projecting still images on garage doors, walls, and entryways. These projectors generally display a holiday-themed image which is printed on a slide inserted in the projection units. A motorized projector may also display a number of varied still images in succession.

Interactive decorations are more popular because they spark notice by viewers. Outdoor lighted yard displays achieve animation by activating select lamps on light strings to emit light in timed sequences. An increasingly popular holiday decoration is a projection show that is capable of displaying a simulation of moving images. Various kinds of projected images may be displayed with a projector, including graphics, animations and other projected optical effects. Although such systems offer great entertainment value, they are also prohibitively expensive for most households.

U.S. Pat. No. 4,814,800 to Lavinsky et al. teaches a "light show projector" that is used to produce a laser-like visual line pattern on a display surface. The Lavinsky invention comprises a light source that is first aimed through a rotatable color wheel and further through an adjustable focusing lens. Instead of relying on traditional film, this invention utilizes a rotating colored wheel to simulate the laser-like visual pattern.

U.S. Pat. No. 4,253,749 to Boudouris teaches an "electronic theater projector" that utilizes indexed wheels to transport film. A light source is placed directly behind the film, and its path is not altered by a reflecting element.

U.S. Pat. No. 5,570,138 to Baron discloses a "combination outdoor advertising billboard" that comprises a projector to display advertisement images during nighttime.

U.S. Pat. No. 3,706,439 to Skinner et al. teaches a "motion picture viewer with a removable cartridge. A film cartridge may be removably mounted in the housing, and further comprises an aperture through which the film can be advanced.

A problem with the existing holiday-image projectors is that they are either incapable of displaying a moving image, or they are too expensive and too bulky to be available to a typical consumer. The present invention provides an effective solution of displaying a simulated laser show that is a very cost effective alternative to purchasing expensive animated light displays. The present invention is an animated picture projector which reciprocates in repeated succession stationary and adjacent images on a slide to give an impression of movement.

SUMMARY OF THE INVENTION

It is an object of the present invention to provide an outdoor holiday decoration that is animated. It is a further object to provide a method of achieving such animation.

It is an object to provide a yard projector that projects animated images on a structure's exterior surface.

It is an object that the present yard decoration is capable of year-long use, wherein different slide cartridges, each having seasonally-themed images, can be removably inserted in the projector.

It is envisioned that the present projector comprise a copper wound solenoid that forces a translating rod to reciprocate in a spiked motion. Using the solenoid, electric current is sent through a coil of wire to induce a magnetic field. This magnetic field forces a permanent magnet, on the translating rod, to move side-to-side depending on a direction of the current. An elongated slot in the rod seats a slide cartridge having at least two stationary, adjacent images. The slide reciprocates in repeated succession, wherein the images are alternatively illuminated by an LED and magnified through a lens. The images are shuffled to give an impression of movement.

It is further envisioned that in an alternate embodiment, a motor forces the translating rod to reciprocate. The alternate method to achieve the reciprocated motion is accomplished by means of an electric motor which converts rotational motion to a reciprocating motion.

A yet alternative method may utilize a motor having a plurality of magnets with different polarities. A circuit in communication with the motor causes at least one of the magnets to continuously shift or alternate positions, wherein its orientation with a magnet having same polarity forces the shaft away from the motor and its orientation with a magnet having opposing polarity draws the shaft towards the motor.

It is an object that the present projector achieves the animated effects of lighted holiday displays, but at a lower manufacturing and sales cost. It is an additional object that the present projector not consume a same amounts of energy required to illuminate lighted holiday animation displays, but that it rather accomplishes the same at a fraction of the required amounts.

It is a final object to provide all of benefits the foregoing objects entail.

BRIEF DESCRIPTION OF THE DRAWINGS

Advantages and features of the present invention are better understood with reference to the following and more detailed description and claims taken in conjunction with accompanying drawings, in which like elements are identified with like symbols.

DESCRIPTION OF THE PREFERRED EMBODIMENTS

The best mode for carrying out the invention is presented in terms of its preferred embodiment, herein depicted within the Figures.

1. Detailed Description of the Figures

The present invention teaches a reciprocating animation slide projector and a method of projecting a moving image. Image projection componentry 10 of the animation projector is shown in detail in FIGS. 1-6. The projector comprises a housing mounted on a support stand, a spike or a tripod. The housing encloses the image projection componentry 10, which namely comprises an illumination means, a power system, a solenoid, and a removeable slide cartridge. The illumination means 12 is a conventional lamp or a light emitting diode (LED) that is vertically mounted in the housing. The LED has sufficient power characteristics to clearly display a six (6) foot high image from at least 8-25 feet away. It is preferred that the illumination means is a 3-Watt LED similar to that used in animated light show projectors.

Figure 1:
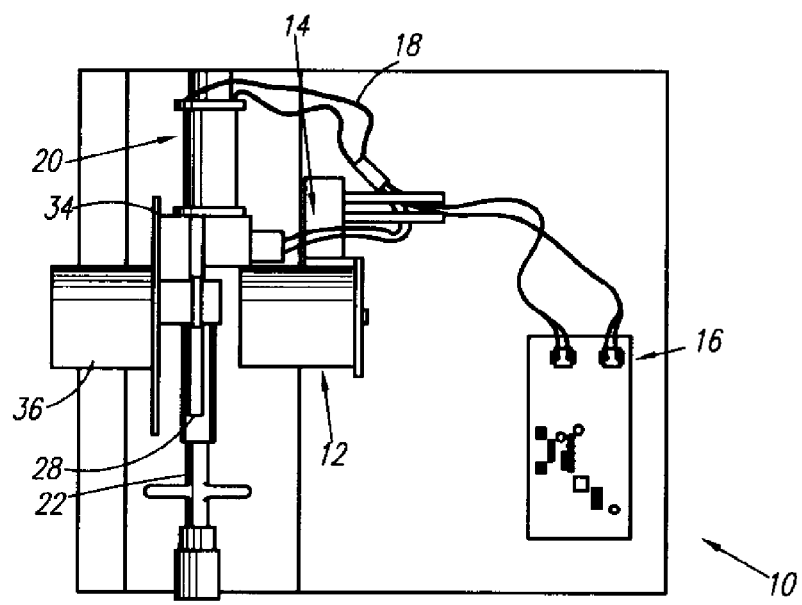
FIG. 1 is a top perspective view of the internal componentry of a reciprocating animation slide projector according to the present invention.

A first set of wires 14 travels from an electronic circuit board 16 to the illumination means 12. The wires are in communicative relationship with the LED lamp 36 to control activation and deactivation of the light source. The projector is powered by an external power source, s.a., e.g., a power cord that plugs into a port or a plug comprised on its exterior. FIG. 1 shows the power received from a transformer, similar to a unit used on an animated light show projector. The circuit board 16 controls an activation of the LED lamp such that it emits light in response to a time-command or to a manual switch (not shown). It is preferred that a dwell time be programmed into the circuit for ½ second.

The LED lamp emits light in a forward direction only. An adjustable-focus lens, spaced a distance in front of the LED lamp, enlarges an image projected therethrough. A heat sink may be further incorporated within the componentry 10 to prevent the projector from overheating.

The novel features of the present projector are described hereafter to teach the method of projecting a moving image. A second set of wires 18 travel from the circuit board 16 to a solenoid assembly. The circuit board similarly controls activation of the solenoid assembly in response to a timed command or to a manual switch. The solenoid assembly comprises a copper wound solenoid 20 having an elongated permanent magnet on a translating rod 22 extending therefrom. Using the solenoid 20, electric current is sent through a coil of wire to induce a magnetic field. This magnetic field forces a permanent magnet (not shown), on the translating rod 22, to move side-to-side depending on a direction of the current. The wire gauge on the coil is 0.13 mm, and the coil preferably comprises a 300Ω resistance. A heavier wire gauge, between 0.2 to 0.25 mm) is preferred. The translating rod 22 reciprocates in a forward-and-back motion over a cylindrical track 24 in relation to the solenoid 20. It travels an approximate distance of 0.625 inches. The circuit 16 reverses the current to reverse polarity of the electromagnet.

In an alternate embodiment to the invention, the second set of wires 18 can travel from the circuit board 16 to a motor assembly. The circuit board similarly controls activation of the motor assembly in response to a timed command or to a manual switch. The motor assembly comprises a motor (not shown) having the translating rod 22 extending therefrom. It is preferred that the motor be a small 300Ω, 12.0V motor. The translating rod 22 reciprocates in a forward-and-backward motion of the cylindrical track 24 in relation to the motor. It is envisioned that the motor may internally comprise at least one magnet (not shown). The circuit 16 commands the at least one magnet to continuously shift or alternate positions. The magnet changes its orientation, which promotes a response by at least a corresponding, second magnet either in the motor or on the rod. When the magnets' orientations (towards one another) each have same polarity, the translating rod 22 is forced away from the motor. Alternatively, when the magnets' orientations each have opposing polarity, the translating rod 22 is drawn towards the motor. The circuit 16 commands the at least one magnet to flip every select number of seconds so that its pole-orientation drives the rod 22 to reciprocate in the spiked motion. The circuit thus reverses the polarity of the magnets.

In an alternate embodiment to the present invention, a gearing assembly comprising a main gear, mounted for rotation, engages with a cylindrical gear mounted on the translating rod of an electric motor. When an electric motor is activated and an output shaft of the motor rotates, the cylindrical gear mounted on the output shaft rotates and drives the main gear. The main gear is mechanically connected with a receiver portion of the translating rod. The main gear, with the translating rod receiver portion, converts rotational motion of the cylindrical gear into a reciprocating motion. Accordingly, the cylindrical gear turns and as the main gear turns and receiver portion of the translating rod is driven to reciprocate.

Figure 2:
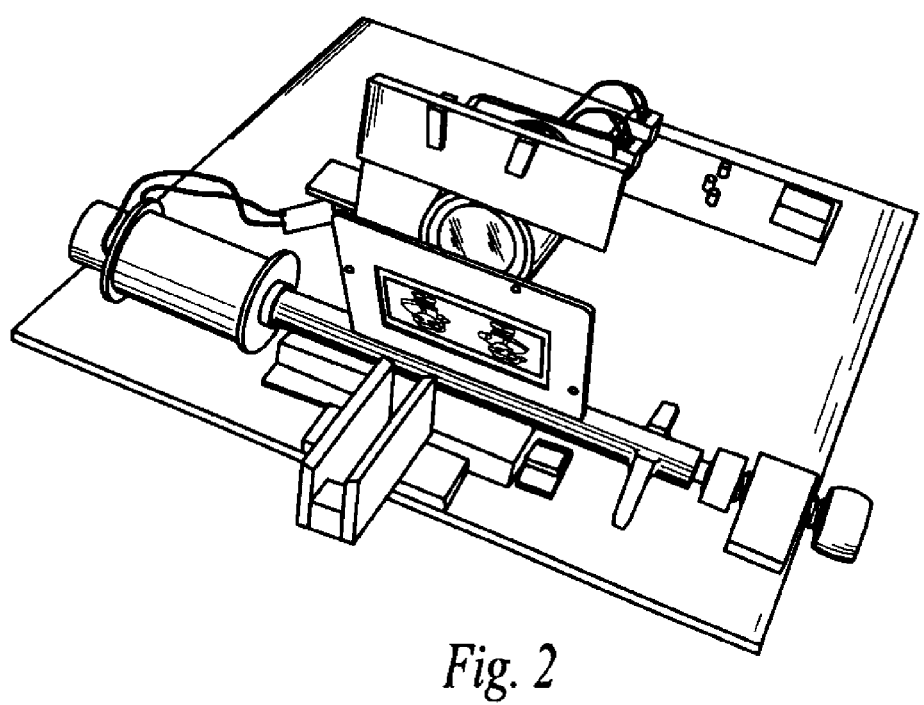
FIG. 2 is a top elevational front view of the projector of FIG. 1.
Figure 3:
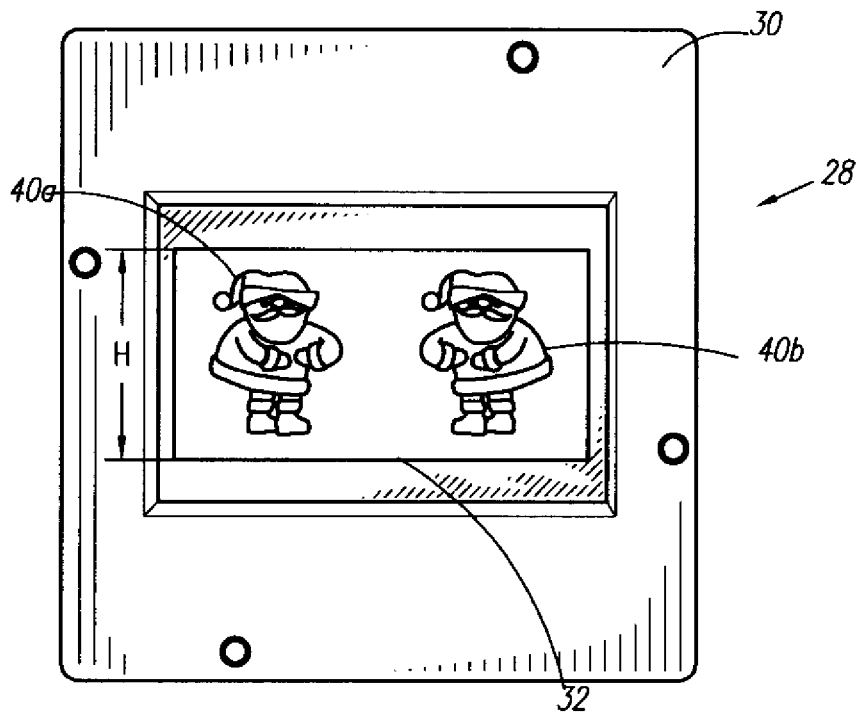
FIG. 3 is a film cartridge that inserts into the present projector.

An elongated slot 26 comprised on a top facing length of the translating rod 22 seats a removeably insertable slide cartridge 28 (shown in FIG. 2). The cartridge 28 shown in FIG. 3 is a frame 30 enclosing a transparent slide 32. The slide comprises at least two stationary and adjacent images that are related, but slightly varied, such that they give an illusion of movement to a viewer viewing them in sequence. It is preferred that a height H of the images is ½ inch. The slide cartridge is shown in FIG. 3 to have to almost mirrored images of a Santa Clause; the Santa Clause appears to swing his arms in a jovial back-and-forth motion while his hips swing, his hat flops, and his head nods.

Figure 4:
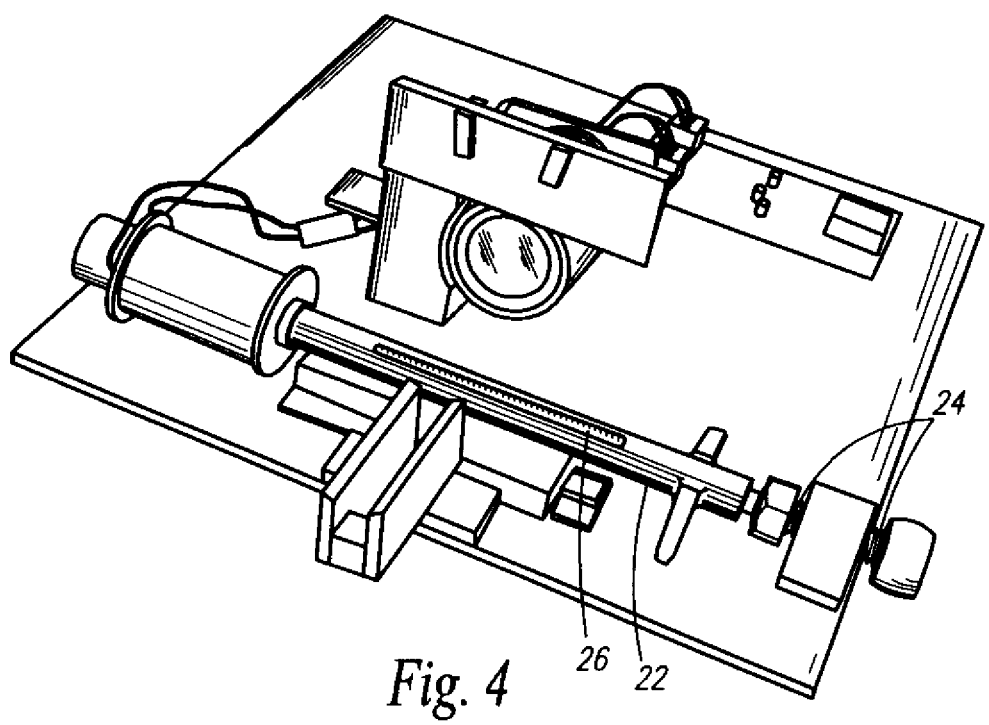
FIG. 4 is an elevational front view of the projector of FIG. 1 with partial componentry.
Figure 5:
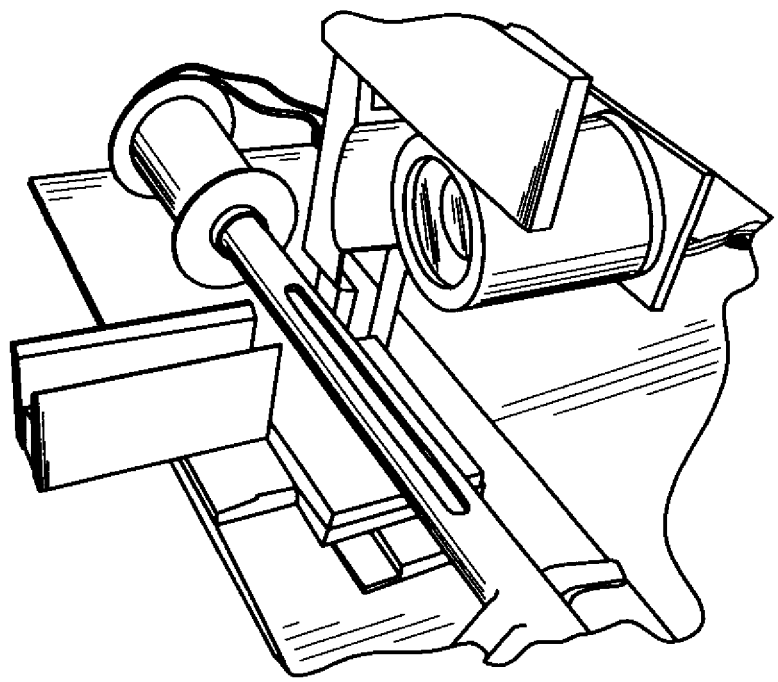
FIG. 5 is a front-side view of the projector shown in FIG. 4.

The translating rod 22 and the track 24 it slides along are comprised in front of the illumination means 12 (as shown in FIGS. 4 and 5) such that the elongated slot 26 is directly in front of the LED light. The transparent slide 32 permits light from the LED to be emitted therethrough so that the image thereon is projected on a flat surface in the yard. An adjustable stop 42 on the translating rod 22 limits its travel.

Figure 6:
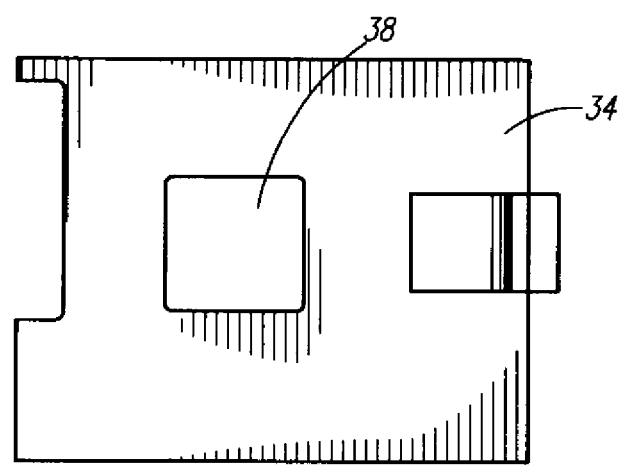
FIG. 6 is a window-screen that makes up componentry of the present projector.
Figure 7:
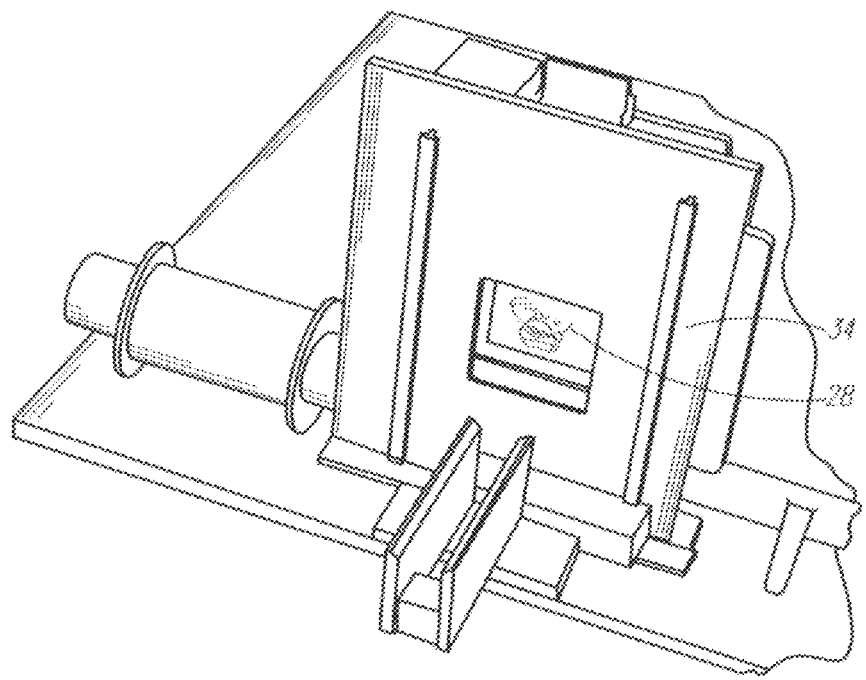
FIG. 7 is a front view of the window-screen of FIG. 6 on in the projector.

FIG. 6 shows a plate 34 placed in front of the slide cartridge 28 but behind the adjustable lens' 36 (FIG. 1) region. The plate 34 blocks excess light emitted from the LED light 12 so that it is channeled, and not diluted, specifically through a window 38 and towards the lens 36. The plate 34 prevents scattering of light. The window 38 is only large enough to frame one of the at least two stationary images 40*a*, 40*b*. As the translating rod 22 reciprocates, it alternates between the at least two images in repeated succession.

Figure 8A:
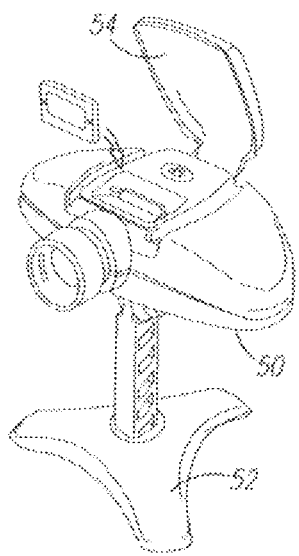
FIG. 8*a* is a front elevational view of the present projector housing.
Figure 8B:
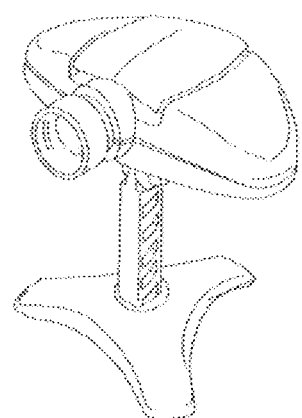
FIG. 8*b* is a front elevational view of an operation of the projector.
Figure 9:
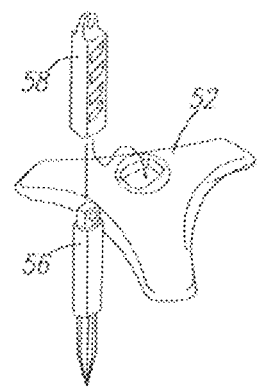
FIG. 9 is a stake means affixable to the housing of FIGS. 8*a/b*.

The plate 34 is stationary, but the slide cartridge 28 is removable. Slide cartridges having one set of themed images can be interchanged with alternate cartridges having different themes. It is envisioned that the present projector is removably planted (by means of a stake, etc.) in a yard, wherein a holiday themed slide cartridge is inserted in the projector during appropriate seasons. The housing comprises a door 54 thereon providing access to the elongated slot. The cartridge 58 is removable inserted in the housing in front of the lens 36. The housing 50 is shown in FIGS. 8*a/b* to be elevated over a general base 52. The base 52 supports the present projector on a table or other flat surface; however, a leg 58 extending from an underside of the housing removably removes from the base so that the projector is capable of being supported from the ground. The FIG. 9 shows a stake 56 having a male projection capable of receipt in a distal end of the leg 58.

The present housing is manufactured from a weatherproof, durable, sturdy plastic material that can withstand high winds, hot and freezing temperatures, hail, sleet, rain, snow, and humidity.

Figure 10:
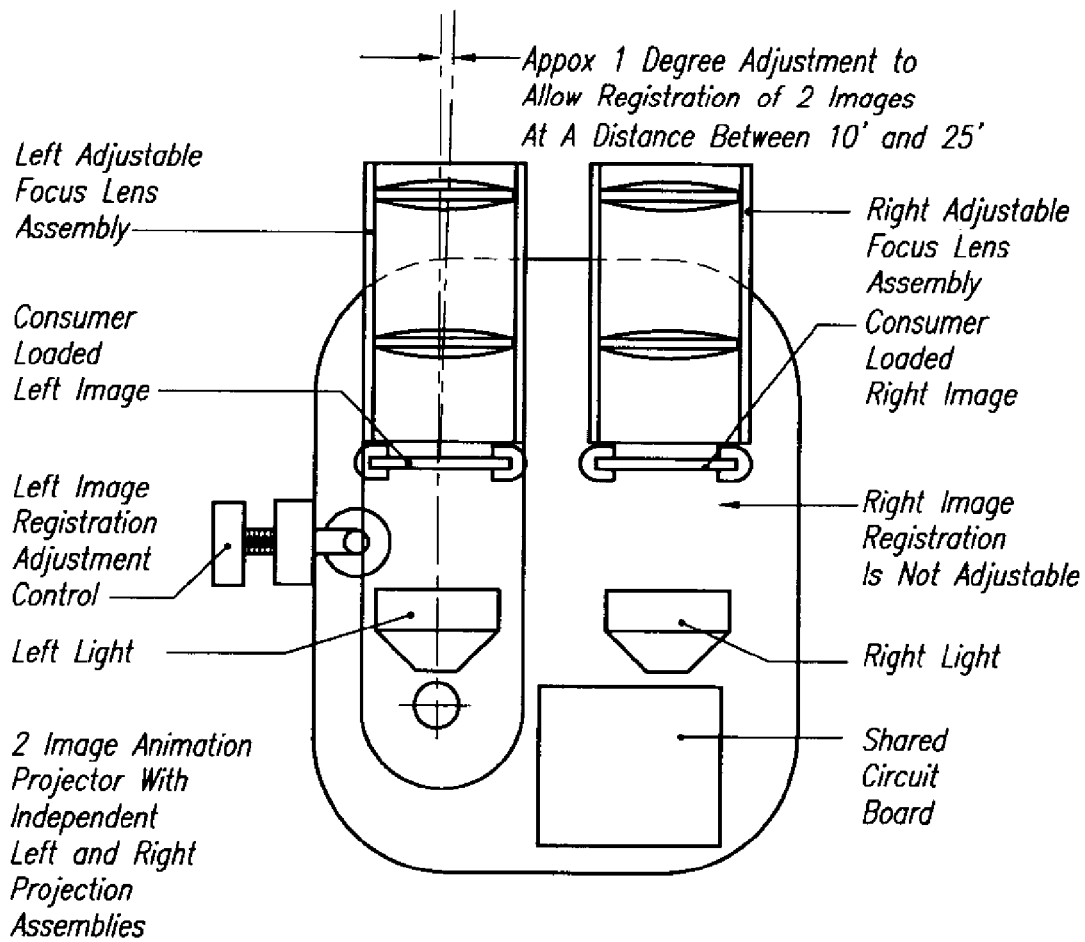
FIG. 10 is a second embodiment of the present invention.

An alternate embodiment of the present invention is shown in FIG. 10 to utilize two sets of LED and lens displays with a single circuit board; respective lights are alternatively shone through one of two stationary and adjacent slides. In this manner, there are no moving parts.

The foregoing descriptions of specific embodiments of the present invention are presented for purposes of illustration and description only. They are not intended to be exhaustive nor to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and the embodiments with various modifications as are suited to the particular use contemplated. It is intended that a scope of the invention be defined by the Claims appended hereto and to their equivalents. Therefore, the scope of the invention is to be limited only by the following claims.

What is claimed is:

1. A reciprocating animation slide projector enclosed in a housing on a support, wherein said projector comprises:
   an illumination means;
   a power system;
   a solenoid;
   a set of wires that travels from a circuit board to a solenoid having an elongated translating rod extending therefrom, said translating rod capable of reciprocating in a forward-and-back motion over a cylindrical track;
   a frame enclosing a transparent slide having at least two adjacent, nonidentical but similar images that are related, but slightly varied;
   an elongated slot on a top facing length of said translating rod, said elongated slot seats said removable slide cartridge inserted therein;
   a lens operatively positioned relative to said illumination means;
   a removable slide cartridge actuated by said solenoid, and a fixed plate placed in front of said slide cartridge and behind said lens, said plate for blocking excess light emitted from said illumination means so that said light is channeled, and not diluted, specifically through a window thereon and towards said lens;
   wherein said removable slide cartridge reciprocates in repeated succession between said at least two adjacent, nonidentical but similar images on said transparent slide to give an impression of movement of the projected image.

2. The projector of claim 1, wherein said window is only large enough to frame one of said at least two images, said at least two images alternate in repeated succession as said translating rod reciprocates.

3. The projector of claim 1, further comprising a first set of wires that travels from an electronic circuit board to said illumination means, said first set of wires are in communicative relationship with said LED to control activation and deactivation of said illumination means.

4. A method of emulating a moving image via a reciprocating animation slide image projector enclosed in a housing on a support, adapted for moving images by reciprocating in repeated succession at least two adjacent, stationary images on a slide to give an impression of movement a projected image, wherein said projector comprises:
   a removable slide cartridge having at least two adjacent, nonidentical, similar images enclosed in a housing on a support and comprising a frame enclosing a transparent slide having at least two adjacent, nonidentical similar images that are related, but slightly varied;
   said protected image is illuminated by a light emitting diode having sufficient power characteristics to clearly display an image from at least 8-20 feet away,
   an elongated slot formed by said removable slide cartridge on a top facing length of a translating rod, said elongated slot adapted for seating said removable slide cartridge inserted therein; and
   said slide cartridge comprises a frame enclosing a transparent slide having at least two adjacent images that are related, hut slightly varied;
   wherein said projector further comprises a fixed plate operatively placed in front of said slide cartridge and behind said lens, wherein said plate blocks excess light emitted from said illumination means so that it is channeled, and not diluted, through a window thereon and towards said lens.

5. The method of claim 4, wherein said window is only large enough to frame one of said at least two images, said at least two images alternate in repealed succession as said translating rod reciprocates.

6. The method of claim 4, wherein said projected image is illuminated by a light emitting diode having sufficient power characteristic to clearly display an image from al least 8-20 feet away.

\* \* \* \* \*